No. 664,806. Patented Dec. 25, 1900.
C. B. BOSWORTH.
TESTING APPARATUS FOR PRESSURE GAGES.
(Application filed May 28, 1900.)
(No Model.)

WITNESSES
Frank G. Parker
Louis A. Jones

Charles B Bosworth
INVENTOR

UNITED STATES PATENT OFFICE.

CHARLES B. BOSWORTH, OF EVERETT, MASSACHUSETTS, ASSIGNOR TO THE ASHTON VALVE COMPANY, OF HARTFORD, CONNECTICUT.

TESTING APPARATUS FOR PRESSURE-GAGES.

SPECIFICATION forming part of Letters Patent No. 664,806, dated December 25, 1900.

Original application filed May 7, 1900, Serial No. 15,827. Divided and this application filed May 28, 1900. Serial No. 18,321.

(No model.)

*To all whom it may concern:*

Be it known that I, CHARLES B. BOSWORTH, of Everett, in the county of Middlesex and State of Massachusetts, have invented a new and useful Improvement in a Testing Apparatus for Pressure-Gages, of which the following, taken in connection with the accompanying drawings, is a specification.

My invention relates to an apparatus for testing pressure-gages; and it consists in the peculiar construction and arrangement of the parts that act as transmitters of the pressure as measured by the weights to the fluid which acts upon the gage to be tested, and is a division of my application, Serial No. 15,827, filed May 7, 1900, the object being to make a very compact device that is capable of an extensive range. This object I attain by the mechanism shown in the accompanying drawings, in which—

Figure 1:
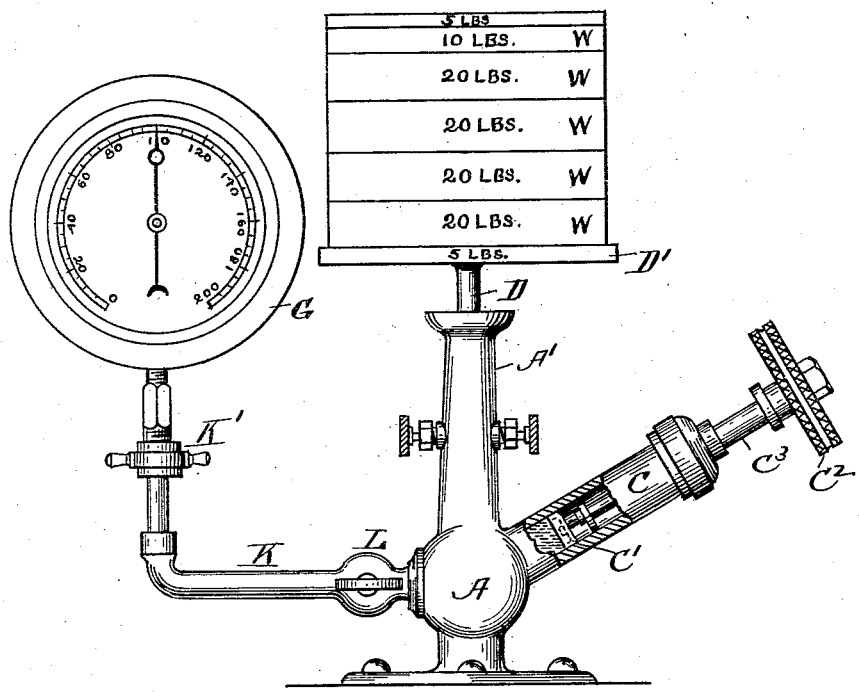
Figure 2:
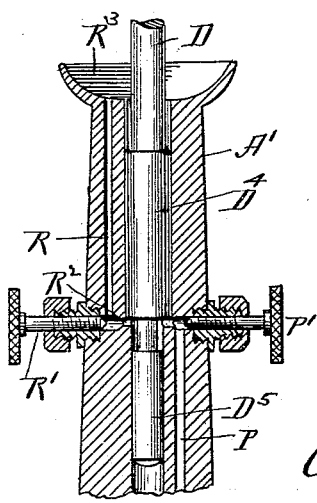

Figure 1 is an elevation of my apparatus having a gage attached. Fig. 2 is a vertical section showing the interior of the cylinder and the arrangement of the piston that transmits the pressure due to the weights to the gage.

In the drawings, A represents a base or standard to which the operating parts are attached.

A' is a hollow standard interiorly connected to the adjusting-cylinder C and to the pipe K, which in turn is connected by the coupling K' to the gage G which is to be tested. A piston-rod D has an attached disk D' at its upper end, upon which the various weights W W are placed, as shown, so that their combined weights will act upon a piston $D^4$, attached to the end of the rod D and adapted to work in the cylinder A', Fig. 2. The number and size of the weights placed upon the disk D' will depend upon the amount of pressure to be tested.

The adjusting-cylinder C has a piston C' attached to the end of the screw-stem $C^3$, which is turned by the hand-wheel $C^2$. The piston C' is made to fit fluid-tight and exerts its force on the fluid contents of the apparatus, so that any movement of the piston C' will cause a corresponding movement or adjustment of the fluid, so that it may sustain the weight of the combined weights W W and transmit the corresponding pressure to the gage to be tested.

I will now describe my improved pressure-transmitting piston. (Illustrated in Fig. 2.) This piston presents two areas to the action of the fluid—that is, the area presented by the part $D^4$ and also the area presented by the part $D^5$. When the area of the part $D^5$ is to be used, the passage P, which connects with the fluid in the lower part of the standard, is closed by the needle-valve P', and the fluid will act directly upon the end area of the part $D^5$. If the part $D^4$ is to be used, then the passage P is open and the passage R is closed, so that the fluid will act on an area equal to the area of the section of $D^4$. The passage R is opened and closed by the valve R' and serves solely for the escape of wastage from $R^2$ to the basin $R^3$. The areas of $D^4$ and $D^5$ are of some known definite amount measured in parts of a square inch, so that it is a simple matter to estimate the pressure per square inch that is acting upon the gage G.

L is a stop-cock of ordinary construction.

I claim—

In a pressure-gage-testing apparatus, a cylinder-standard containing a pressure-transmitting fluid, and having a piston of two working areas and a valvular-controlled passage admitting the pressure-transmitting fluid to one of the said areas, as described, said piston adapted to support weights and to be balanced by said fluid; a pipe, as K, adapted to interiorly connect the said cylinder with the gage to be tested; substantially as and for the purpose set forth.

In testimony whereof I have signed my name to this specification, in the presence of two subscribing witnesses, on this 26th day of May, A. D. 1900.

CHARLES B. BOSWORTH.

Witnesses:
FRANK G. PARKER,
LOUIS A. JONES.